No. 745,511. PATENTED DEC. 1, 1903.
D. W. McLAUGHLIN.
STEERING WHEEL FOR TRACTION ENGINES.
APPLICATION FILED FEB. 2, 1903.
NO MODEL.
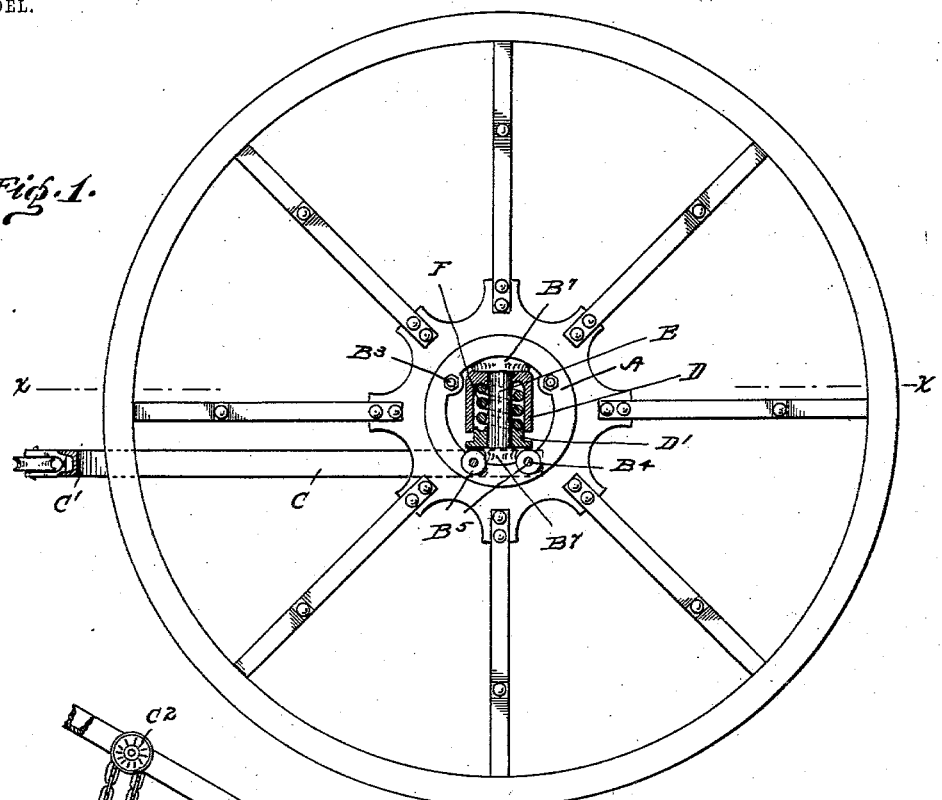
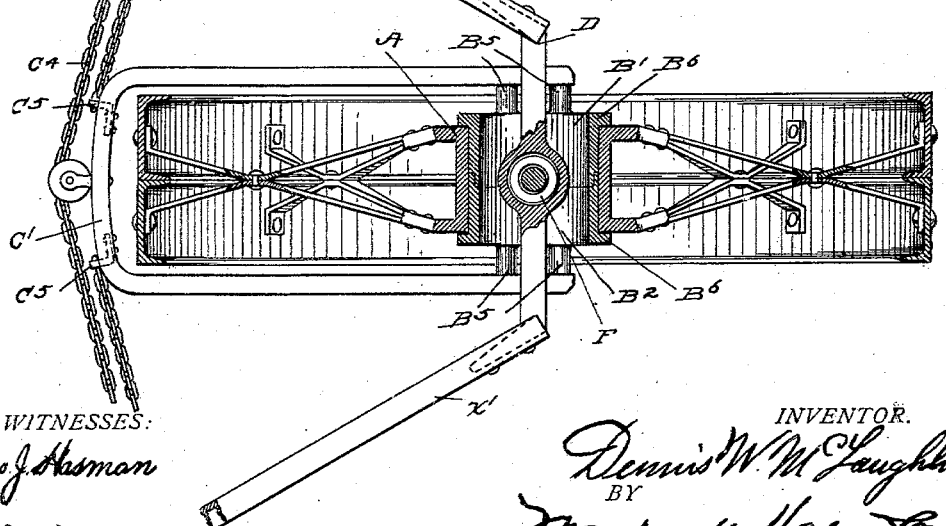

No. 745,511.

Patented December 1, 1903.

UNITED STATES PATENT OFFICE.

DENNIS W. McLAUGHLIN, OF SAN FRANCISCO, CALIFORNIA.

STEERING-WHEEL FOR TRACTION-ENGINES.

SPECIFICATION forming part of Letters Patent No. 745,511, dated December 1, 1903.

Application filed February 2, 1903. Serial No. 141,572. (No model.)

*To all whom it may concern:*

Be it known that I, DENNIS W. MCLAUGHLIN, a citizen of the United States, residing at and whose post-office address is 2711 Howard street, in the city of San Francisco, county of San Francisco, and State of California, have invented certain new and useful Improvements in Steering-Wheels for Traction-Engines; and I do hereby declare the following to be a full, clear, and exact description of the said invention, such as will enable others skilled in the art to which it most nearly appertains to make, use, and practice the same.

This invention relates to improvements in traction-engines and other motor-vehicles, and particularly to the steering-wheel thereof.

The object of the invention is to so construct and mount the steering wheel or wheels that the pivotal point will be in the vertical center of the wheel, obviating the necessity for cumbersome turn-tables and undue lateral strains in steering.

In the accomplishment of these objects the invention consists, broadly, of a wheel having an enlarged hub rotating upon an annular journal, having a king-pin extending vertically across its center, the supporting-bolster of the engine resting in the annular journal in such a manner that the king-pin acts as the pivot of the wheel, and means for swinging the wheel upon its pivot consisting of a yoke having its ends fixed to the journal on either side and a chain mounted upon rotatable sprockets fixed on the frame of the engine, the free ends of the chain being attached to the loop of the said yoke, whereby the travel of the chain swings the wheel.

In the drawings, Figure 1 is a side elevation of a steering-wheel constructed in accordance with this invention, the engine-bolster being shown in cross-section to disclose the interposed buffer-spring. Fig. 2 is a plan from above in cross-section on the line $x\ x$, Fig. 1, of the same.

In detail the construction consists of a wheel having a tire and spoke construction to suit its application and a central enlarged hub A, suitably faced and dressed to form a bearing with the journal. The journal is made up of the two abutting rings $B'\ B^2$, held together by the bolts $B^3$ and $B^4$. The latter, passing through the bosses $B^5$, serve also to attach the yoke C to the journal. To preserve the alinement of the bearing-face, the rings $B'\ B^2$ meet in a dovetail joint. To take up the side thrust, the journal is provided with the lateral flanges $B^6$, abutting the face of the hub. The load of the engine rests upon the bolster D, extending between the converging ends $X'$ of the frame of the engine. The king-pin E extends vertically through the center of the bolster and is embedded in the bosses $B^7$ on the journal. The spring F, surrounding the king-pin, acts as a buffer to absorb the jar incident to locomotion. To avoid contact of the spring with the king-pin, the annular block $D'$, fitting snugly the king-pin and extending into the bore of the bolster, is provided, which, in connection with the bore in the bolster reduced at the top to the diameter of the king-pin, allows sufficient lateral space for expansion and contraction of the spring. The loop $C'$ of the yoke C is bent on an arc, with its radius at the pivotal center of the wheel, the steering-sprockets $C^2$, one of which is suitably geared to operating mechanisms within reach of the operator, being fixed on the frame $X'$ in line with this arc. It is obvious that the steering-chain $C^4$, extending between the sprockets with its free ends to the lugs $C^5$ on the yoke, will cause the yoke to follow the line of travel of the chain, changing the direction of the wheel at the will of the operator.

In traction-engines or motor-cars having two steering-wheels the only necessary alteration in the construction is to terminate the bolster at the pivotal point of the two wheels and connect the two yokes to operate synchronously, or the yoke may be substituted by any of the well-known steering connections.

The application of ball, roller, or other antifriction bearings to the construction and the application of different tire and spoke construction are too obvious to require extended description; but I do not wish to be confined to the exact construction as shown.

Having thus described this invention, what I claim, and desire to secure by Letters Patent, is—

1. In a steering-wheel for traction-engines, a wheel rotating on an annular journal, composed of abutting rings having flanges between which the hub of the wheel is confined, a king-pin extending vertically across the center of the opening through said journal, a bolster extending into said journal and engaging said king-pin: whereby said pin becomes the pivot upon which said wheel is swung by a yoke attached to either side of said journal and actuated by a chain operating between sprockets mounted upon the frame of the engine: substantially as described.

2. In a steering-wheel for traction-engines, a wheel rotating on an annular journal, said journal having a king-pin extending transversely across its opening, a bolster engaging said pin, whereby the pin becomes the vertical axis of said wheel, a spiral spring encircling said pin and interposed between said bolster and its bearing on the journal of the wheel, as set forth.

3. In a steering-wheel for traction-engines, a sectional annular journal, a wheel mounted to rotate thereon, a king-pin extending transversely of said journal, and a cushioned bolster engaging said pin, as set forth.

4. A steering-wheel having its hub pivoted upon its vertical center and cushioned at its pivotal point.

In testimony whereof I have hereunto set my hand this 12th day of January, 1903.

DENNIS W. McLAUGHLIN.

Witnesses:
 BALDWIN VALE,
 V. BERKA.